United States Patent [19]
Simpson

[11] Patent Number: 5,972,085
[45] Date of Patent: Oct. 26, 1999

[54] PRINTED ARTICLE AND METHOD

[75] Inventor: David Simpson, Runcorn, United Kingdom

[73] Assignee: Willett International Limited, United Kingdom

[21] Appl. No.: 08/828,437

[22] Filed: Mar. 28, 1997

[30] Foreign Application Priority Data

Mar. 29, 1996 [GB] United Kingdom ............... 9606729

[51] Int. Cl.⁶ ........................... C09D 11/08; B41M 1/30; B41M 7/00
[52] U.S. Cl. ........................... 106/31.42; 106/31.74; 106/31.96; 106/236; 106/238; 106/241; 101/487; 101/491
[58] Field of Search ................ 106/31.42, 31.74, 106/31.96, 236, 238, 241; 101/491, 487

[56] References Cited

U.S. PATENT DOCUMENTS

| 3,694,237 | 9/1972 | Piotrowski | 106/31.96 |
| 5,397,387 | 3/1995 | Deng et al. | 106/26 R |

FOREIGN PATENT DOCUMENTS

| 359230071 | 12/1984 | Japan | C09D 11/00 |
| WO 97/17409 | 5/1997 | WIPO | C09D 11/00 |
| WO 97/35933 | 10/1997 | WIPO | C09D 11/00 |

*Primary Examiner*—David Brunsman
*Attorney, Agent, or Firm*—Charles D. Gunter, Jr.

[57] ABSTRACT

The present invention relates to the use of shellac as the binder in an ink composition to reduce the problems of sweating when the ink is applied to a soft gelatin surface. Preferably, the shellac is at leat partially neutralised by a volatile base, for example ammonia, to render the shellac water soluble so that a water and/or alcohol liquid carrier medium may be used.

9 Claims, No Drawings

PRINTED ARTICLE AND METHOD

The present invention relates to a printed article and to a method for printing that article, notably to a method of printing images on a soft gelatin surface and such a printed surface.

BACKGROUND TO THE INVENTION

Ink jet printers apply a wide range of ink compositions to a wide range of surfaces as discrete droplets of ink which form an image on the surface. The droplets can be applied using drop on demand or impulse jet printers in which individual droplets are ejected from individual nozzle orifices in an array of nozzles, the position of the printed droplet on the surface being dictated by the nozzle in the array from which it is ejected. Alternatively, the ink jet printer can be a continuous jet printer in which droplets are formed from a jet of ink issuing from a single nozzle, the droplets being given an electric charge and passing through a deflection field which deflects the flight of the individual droplets away from the straight line path by an amount depending upon the strength of the charge and/or the deflecting field. For convenience, the term ink jet printer will be used herein to denote all such types of printer.

The inks can be used to form a wide range of types of image, for example date, batch or quality codes, bar codes, manufacturer's names, logos or other images, both pictorial and alphanumeric. Furthermore, such images need not be visual, but may be machine readable or detectable, for example by electo-optic means when the image is caused to fluoresce under infra-red or ultra-violet radiation or when the pigment is electromagnetic and the image carries electromagnetic data. For convenience, the term image will be used herein to denote in general all such images.

Ink jet printers employ a wide range of inks which, in general comprise a pigment, dyestuff or other image forming component and a resin or other binder in a fluid carrier medium. The fluid carrier medium can be water or an organic solvent or carrier, for example an alkanol, ketone or ester and mixtures thereof. Where the ink is to be used in a continuous jet printer, the ink has a conductivity so that it can accept an electric charge. This conductivity can be provided by salts or other polar materials present in one or more of the above ingredients, or can be provided by one or more additional materials.

It has been proposed to print images on hard gelatin capsules using ink jet printers. Since such capsules usually contain a material which is to be ingested by the user or applied to the skin, the inks used should contain only physiologically acceptable ingredients. However, where such inks are applied to soft gelatin surfaces as opposed to hard gelatin surfaces, it has been found that the gelatin sweats and the printed droplets readily detach from the surface so that the printed image is destroyed. As a result no commercially acceptable method exists for printing images on soft gelatin surfaces.

Surprisingly, we have found that the above problems can be reduced by the use of shellac, notably ammoniated shellac, as the binder in inks applied to soft gelatin surfaces.

SUMMARY OF THE INVENTION

Accordingly, the present invention provides a method for printing images onto a soft gelatin surface, particularly using an ink jet printer, which method comprises applying to the soft gelatin surface an ink composition comprising shellac as a binder for the image forming ingredient of the ink.

Preferably, the ink composition is put up in an aqueous carrier medium and the shellac has been rendered water soluble by neutralisation of at least part of the carboxylic acid function thereof by a volatile base, notably ammonia.

The invention also provides a soft gelatin surface which carries an image thereon which comprises an image forming component and shellac as a binder for that component.

That shellac should be effective in reducing the problems associated with sweating on soft gelatin surfaces is surprising since other resins, for example cellulose derivatives, are not effective.

The invention can be applied to the printing of any type of image onto a wide range of soft gelatin substrates. The substrate can be formed wholly from a soft gelatin, as with a soft gelatin capsule for use in the containment of medicaments. Alternatively, the soft gelatin substrate may be a surface layer or coating of soft gelatin on some other material, for example a coating on the surface of a foodstuff or a medicament pill or the like. For convenience, the invention will be described hereinafter in terms of a capsule made wholly from a soft gelatin. Such capsules and their manufacture are known and commercially available forms thereof may be used without modification in the present invention.

The term soft gelatin is used herein to denote a gelatin which is flexible and contains gelatin, water and a plasticizer for the gelatin, typically a polyhydric lower alkanol. Suitable plasticizers are trihydric straight chain alkanols containing from 3 to 5 carbon atoms, notably glycerin, and are present in from 5 to 60%, notably from 7.5 to 50%, particularly 10 to 40%, by weight of the dry gelatin. Hard gelatin does not contain the plasticizer and is brittle as opposed to flexible. Such soft gelatins are commercially available and may be used in the present invention in their commercially-available forms and compositions.

The ink composition can be applied by any suitable means to the soft gelatin substrate. However, it is preferred to use an ink jet printer since this will enable the image to be formed accurately upon a three dimensional surface and to vary the image to be printed. Such printers can be of any suitable form and many forms of such printers are available commercially. Where the ink is to be applied through a continuous ink jet printer, it will usually be necessary to incorporate one or more polar or ionic components into the ink so that it will have sufficient conductivity to accept the charge to be induced in it. Typically, it will be desired to use an ink composition with a conductivity of from 500 to 3500 $\mu$S at 20° C. This can be achieved by the addition of a salt to the composition. The nature of the salt and the amount used can be those used in conventional ink compositions, for example by the use of a dye in its salt form or which already contains a salt. The ammoniation of the shellac binder in the composition may provide at least part of the conductivity required in the composition, but this will usually be insufficient to achieve the total desired conductivity. For convenience, the invention will be described hereinafter in terms of an ink for use in continuous ink jet printer.

The ink compositions for use in the present invention comprise an image forming component, the binder and a fluid carrier medium. Since the ink composition may be applied to a product which is to be ingested by the end user, it is preferred that all the components of the ink composition be physiologically acceptable. Alternatively, the dried ink composition, after loss of its volatile components (including the base and volatile components of the carrier medium, such as the ethanol and any denaturing methyl alcohol therein), results in a residual film which is physiologically acceptable.

The image forming component can be selected from a wide range of materials having regard to the purpose to which the image on the soft gelatin surface is to be put. Thus, the image forming component can be one which fluoresces under ultra violet light or which can be detected by a magnetic reader. However, it is preferred that the component be one which forms a visible image on the capsule surface, for example a water soluble or water miscible dye or a pigment, preferably a dyestuff. For convenience, the invention will be described hereinafter in terms of a water soluble food grade dyestuff. Such dyestuffs can be selected from a wide range of known dyestuffs commercially available for use in ink jet ink compositions. As indicated above, the dye may contain salts due to its method of manufacture and the dyestuff may be used in its commercially available purity without the need for further purification for present use.

The ink composition contains a shellac resin as the binder. Such resins are available commercially and may be used in their commercially available forms without purification or modification. If desired, the shellac may be used in conjunction with a minor proportion, typically less than 25% by weight based on the shellac resin, of another hydrocarbon resin binder having free carboxylic groups. Examples of suitable other resins include carboxymethyl cellulose, methylcellulose, ethylcellulose, hydroxypropylcellulose, guar gum, xanthan gum, gum tragacanth, gum arabic and rosin. For convenience, the invention will be described hereinafter in terms of the use of shellac as the sole resin binder.

The shellac resin contains carboxylic acid groups and can be used in its free acid form in the present invention. However, it is preferred that at least part of the free acidity has been neutralised with a volatile base so as to render initially water insoluble resins at least partially water soluble so as to permit the use of an aqueous carrier for the ink composition. Thus, in its unneutralised state, shellac is substantially water insoluble, that is it has a water solubility of less than 0.1 g per litre at 25° C. Where the fluid carrier is an organic solvent, for example a lower alkanol or ketone, preferably ethanol, ethyl acetate and/or acetone and mixtures thereof, the resin usually dissolves sufficiently in the carrier to enable an acceptable level of binder, for example from 0.5 to 15%, notably from 2 to 10% by weight, in the ink composition to be achieved. However, where water is present in the carrier, for example in amounts greater that 40% by weight of the total carrier composition, the resin often cannot be incorporated into the carrier medium in sufficient amount to provide the desired level of binder. However, when neutralised with a volatile base, for example ammonia or a lower alkylamine, shellac becomes more readily soluble in water or a water/alkanol mixture. The neutralised shellac can be incorporated into water based ink compositions, for example those containing ethanol and water in weight proportions of from 10:1 to 1:10, in amounts of from 0.25 to 15%, preferably from 0.5 to 10%, by weight. The use of such neutralised resins may also assist the sweat resistance of the printed droplet in that moisture emanating from the soft gelatin surface may be more readily absorbed by residual water soluble forms of the resin than where a non-neutralised resin is used in the ink composition.

Neutralisation is carried out to a pH above 7, notably to a pH value of from 8–10, as measured by a glass combination electrode. The neutralised shellac typically has a solubility in water greater than 200 g per litre at 25° C.

The base used to neutralise the acid groups in the shellac resin is desirably one which is sufficiently volatile to escape from the droplet printed on the substrate so as to cause the shellac to revert to its water insoluble form in situ in the printed droplet. Typically, the base will be one which has a vapour pressure in excess of 70 mm Hg at ambient temperature when measured for a 10% aqueous solution of the base. The base should also be one which is physiologically acceptable and does not leave unacceptable residues in the ink composition, nor should it adversely affect the other components in the ink composition. The preferred base for present use is aqueous ammonia, for example 10% aqueous ammonia solution, or a monoalkylamine, such a monomethylamine.

The shellac resin is present in any suitable amount having regard to the need to produce a uniform and stable ink composition. Furthermore, for use in an ink jet printer the ink composition should have a viscosity of from 2 to 25 Cps at 25° C. It is therefore preferred that the ink composition should contain from 0.25 to 15% by weight of the shellac resin. We have also found that, where the carrier medium is a lower alkanol and the ink is to be applied through an ink jet printer, it is particularly preferred that the shellac resin be present in amounts of from 0.5 to 10% by weight of the total composition, since levels below 0.5% may cause unacceptable loss of hardness in the printed image and at levels above 10% problems may arise due to excessive viscosity.

The ink composition is put up in fluid carrier medium. this may be an organic solvent, notably a lower alkanol, ketone or ester in which the alkyl moieties contain from 1 to 4 carbon atoms, for example methanol, ethanol or isopropanol, ethyl acetate and/or acetone or mixtures thereof. Where the resin is used in a neutralised or partially neutralised form, the carrier medium may be aqueous, for example de-ionised or distilled water, optionally in admixture with a water miscible alkanol. We have found that the use of water/alkanol mixtures containing the alkanol and water in weight ratios of from 10:1 to 1:10, notably about 1:1, is particularly preferred.

The ink composition may contain other ingredients which enhance the solubility of the binder or its protective film forming properties. Thus, the binder may be used in admixture with one or more drying agents.

A particularly preferred ink composition for present use comprises from 0.1 to 5%, preferably from 1 to 3%, by weight of a food grade dyestuff as the image forming component; from 0.5 to 15% by weight of shellac as the resin binder; and water and/or ethanol, notably as a 1:1 mixture, as the fluid carrier medium. Such compositions have a viscosity of from 2 to 20, preferably 2 to 4, Cps at 25° C.

The ink composition can readily be made by mixing the ingredients in the desired proportions in the required solvent or carrier medium. However, it is preferred to incorporate the shellac into part of the alkanol to be used to form the carrier for the total composition. This alkanol composition can then be admixed with the aqueous and/or alkanol solutions of the other components, optionally with heating and agitation.

The ink composition can he applied as a conventional ink using an ink jet printer. However, where the shellac has been neutralised, it may be necessary to heat the printed substrate to aid evaporation of the base and any aqueous carrier medium, for example by passing heated air over the printed substrate.

The invention will now be illustrated by the following Examples in which all parts and percentages are given by weight unless stated otherwise.

EXAMPLE 1

A shellac solution was prepared by dissolving 1 part of shellac in 1 part of ethanol 96 (potable). An ink composition was prepared by mixing 29 parts water and 3 parts food grade blue dye. To the resulting blue solution there were added 62 parts ethanol 96 (potable), 4 parts of the shellac solution and 2 parts ammonia solution (10% $NH_3$). This gave a blue ink composition containing 2% shellac, having a viscosity of 3.1 to 3.3 Cps at 20° C. and a conductivity of 1250 to 1450 µS per cm, which was suitable for jetting through a commercial continuous ink jet printer manufactured and sold by Willett Systems Limited as a Willett 3800 printer.

This ink composition was applied to the surface of commercially available soft gelatin capsules and allowed to dry. The gelatin in the capsules contained about 10% by weight of the gelatine as glycerine BP. Each of the printed capsules was sealed in a glass vial. The glass vials were held in a water bath at 45° C. to promote sweating of the soft gelatine of the capsules. The printed images on the capsules were observed after 30 and 72 hours.

At 30 hours the image remained adherent to the surface of each capsule and there was no softening of the printed image. At 72 hours the image still remained adherent and firm.

When the level of shellac in the ink was raised to 5% similar results were obtained.

By way of comparison, when a cellulose resin, cellulose 2-hydroxypropyl ether, was used in the place of the shellac binder, the image rapidly became soft and after 72 hours the image had run to such an extent that the ink had collected at the base of the vial.

EXAMPLE 2

The process of Example 1 was repeated, except that the level of shellac binder in the ink composition was varied to give values of 0.00, 0.05, 0.25, 0.50, 1.00, 5.00, 7.50, 10.00, 15.00, and 25.00% by weight of shellac binder in the ink. To compensate for the variations in the shellac weight the ethanol percentage was varied so that the total weight of the shellac/ethanol solution was constant. The viscosities of the inks varied from 2.07 Cps, at 0% shellac, to 21.6 Cps at 25% shellac. The conductivities of the inks varied from 1318 µS/cm at 0% shellac to 2110 µS/cm at 25% shellac.

These inks were applied to soft gelatin capsules of the same type as used in Example 1, and the printed capsules were stored in vials in a water bath at 45° C. as described in Example 1. The following results were obtained:

At 0% shellac, the ink spread uniformly over the surface of the capsule;

At 0.05% and 0.25% shellac, the printed image was tacky;

At 25% shellac the printed image was runny and the ink was dropping from the capsule.

By way of contrast, where the printed images were formed from inks containing from 0.5 to 10% shellac, there was no softening of the image and no evidence of damage due to sweating. However, at 15% shellac the printed image was sticky and there was partial loss of the image from the capsule.

EXAMPLE 3

The process of Example 1 was repeated, except that shellac which had been neutralised to pH 7 with 10% ammonia solution was dissolved in a 1:1 ethanol/water mixture to give a 5% shellac solution. 2% by weight of a food grade dyestuff was dissolved in the mixture and the ink was applied to soft gelatin capsules as in Example 1. The printed image showed no sign of softening after 72 hours.

I claim:

1. A method for printing images onto a soft gelatin surface, which method is characterised in that it comprises applying to the soft gelatin surface an ink composition comprising an image forming component and shellac as a binder for the image forming component of the ink composition.

2. A method as claimed in claim 1, characterised in that the ink composition is put up in an aqueous carrier medium and the shellac contains carboxylic acid groups at least some of which have been neutralised with a volatile base so as to render the shellac water soluble.

3. A method as claimed in claim 2, characterised in that the volatile base is ammonia.

4. A method as claimed in claim 1, characterised in that the carrier medium comprises at least one organic solvent selected from the group consisting of a lower alkanol, a lower alkyl ketone and a lower alkyl ester of a lower alkyl carboxylic acid, the alkyl groups containing from 1 to 4 carbon atoms.

5. A method as claimed in claim 1, characterised in that the soft gelatin in said surface comprises a mixture of gelatin and from 7.5 to 50% by weight thereof of a polyhydric lower alkanol in which the alkyl group contains from 3 to 5 carbon atoms.

6. A method as claimed in claim 1, characterised in that the shellac is present in from 0.5 to 15% by weight of the ink composition.

7. A method as claimed in claim 1, characterised in that the soft gelatin surface is on a material to be ingested and the ink composition contains physiologically acceptable ingredients or, upon drying, leaves a deposit which is physiologically acceptable.

8. A method as claimed in claim 1, characterised in that the ink composition comprises;

from 0.1 to 5% by weight of a food grade dyestuff as the image forming component;

from 0.5 to 15% by weight of shellac; and a fluid carrier medium containing at least one of water and ethanol.

9. A method as claimed in claim 1, characterised in that the printed image is heated to assist removal of volatile base and/or volatile carrier from the printed image.

* * * * *